(12) United States Patent
Sedarat et al.

(10) Patent No.: US 8,156,359 B1
(45) Date of Patent: Apr. 10, 2012

(54) LOW-POWER IDLE MODE FOR NETWORK TRANSCEIVER

(75) Inventors: Hossein Sedarat, San Jose, CA (US); Ozdal Barkan, Mountain View, CA (US); William Woodruff, Pleasanton, CA (US)

(73) Assignee: Aquantia Corporation, Milpitas, CA (US)

( * ) Notice: Subject to any disclaimer, the term of this patent is extended or adjusted under 35 U.S.C. 154(b) by 390 days.

(21) Appl. No.: 12/563,927

(22) Filed: Sep. 21, 2009

Related U.S. Application Data (63) Continuation of application No. 12/437,497, filed on May 7, 2009, now abandoned.

(60) Provisional application No. 61/051,293, filed on May 7, 2008.

(51) Int. Cl.
*G06F 1/32* (2006.01)
*H04B 1/38* (2006.01)
*H04B 7/005* (2006.01)

(52) U.S. Cl. .................. 713/320; 455/572; 370/278

(58) Field of Classification Search .................. 713/320, 713/323
See application file for complete search history.

(56) References Cited

U.S. PATENT DOCUMENTS

| | | | | |
|---|---|---|---|---|
| 5,515,364 A * | 5/1996 | Fague | ............................ | 370/278 |
| 6,781,967 B1 * | 8/2004 | Young | ............................ | 370/312 |
| 6,963,301 B2 * | 11/2005 | Schantz et al. | ................ | 342/125 |
| 7,158,503 B1 * | 1/2007 | Kalliojarvi et al. | ............ | 370/347 |
| 7,596,367 B2 * | 9/2009 | Kawasaki | ................... | 455/343.2 |
| 7,729,716 B2 * | 6/2010 | Camp, Jr. | ....................... | 455/522 |
| 7,761,092 B2 * | 7/2010 | Desch et al. | ................ | 455/422.1 |
| 2008/0240013 A1 * | 10/2008 | Johnson et al. | ................ | 370/315 |

* cited by examiner

*Primary Examiner* — Suresh Suryawanshi
(74) *Attorney, Agent, or Firm* — Lance M. Kreisman, Esq.; Mahamedi Paradice Kreisman LLP (57) ABSTRACT

Low-power idle mode for network transceivers. In one aspect, a method for reducing power consumption of a transceiver connected to a communication network includes entering a low-power idle mode, and in this mode, repeatedly turning off a transmitter of the transceiver and turning on the transmitter according to a pattern, where the pattern has been customized based on characteristics of the receiver. Turning off the transmitter conserves power consumed by the transceiver.

32 Claims, 6 Drawing Sheets

LOW-POWER IDLE MODE FOR NETWORK TRANSCEIVER

CROSS REFERENCE TO RELATED APPLICATIONS

This application is a continuation of U.S. patent application Ser. No. 12/437,497, filed May 7, 2009;

This application also claims the benefit of U.S. Provisional Application No. 61/051,293, filed May 7, 2008, and entitled, "Extended Low-Power Idle (xLPI) for 10GBase-T Energy-Efficient Ethernet," which is incorporated herein by reference in its entirety.

FIELD OF THE INVENTION

The present invention relates generally to electronic communications, and more particularly to low-power operation of transceivers used for transmission and reception of data in networks.

BACKGROUND OF THE INVENTION

Network communication standards are widely used in computer networks to communicate information between computers and other electronic devices. One widely-used standard is Ethernet, including several different standards for different network bandwidths. One Ethernet standard is 10GBASE-T, allowing 10 gigabit/second connections over unshielded or shielded twisted pair cables, over distances up to 100 meters. There is a desire to have more energy-efficient Ethernet standards for all flavors of Ethernet including 10GBASE-T.

To reduce the power consumption of 10GBASE-T transceivers, proposals have been suggested for a low-power idle (LPI) mode that consumes less power. The LPI mode turns off most of the component blocks of a transceiver during periods of inactivity, and periodically turns on transceiver blocks for a short period to maintain particular components of transceivers on the network and to determine whether LPI mode should be exited and transceiver power turned on for active operation.

Figure 1:
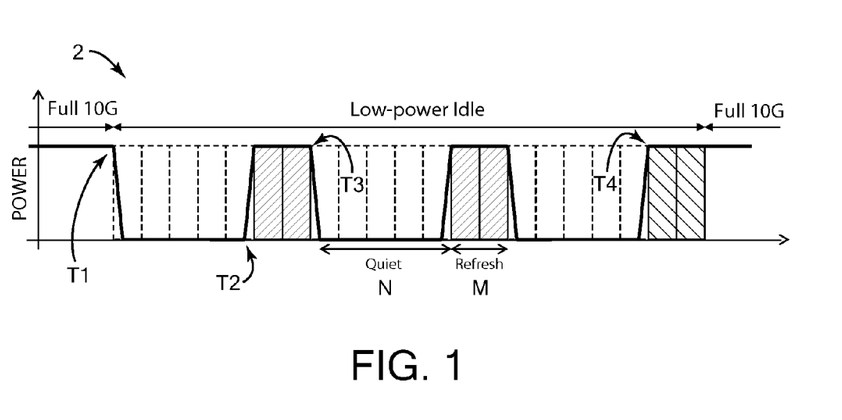
FIG. 1 is a graph illustrating an existing technique for providing a low-power idle mode for a transceiver.

For example, FIG. 1 shows a graph 2 illustrating a proposed power scheme for a low-power idle mode in 10GBase-T. The transceiver blocks consume full power in the nominal mode of 10G operation during active operation. When the transceiver becomes inactive due to having no data to transmit at time T1, the power for the transceiver is turned off to a minimal level and the transceiver enters low-power idle mode. However, the power is periodically turned back on during low-power idle mode for two purposes: 1) to maintain the proper states of near-end and far-end receivers in the transceiver and connected transceivers, such as updating filters and maintaining timing lock, so that the transceivers can return to active operation more quickly, and 2) to be able to detect reception of a transition bit sent by a far-end transceiver, the transition bit requesting the local transceiver to transition back to the nominal full-power mode of 10G operation. Thus, after a predetermined number of time intervals (i.e., frames), power is brought back on at time T2 and kept on for a predetermined number of frames, and is then returned to its minimal level at time T3 for a number of frames. The interval of minimal power level can be considered a quiet interval N during which power is off, followed by a refresh interval M during which power is temporarily brought back on (the interval N+M being the refresh period). This sequence of quiet and refresh intervals is repeated until a transition bit is detected during a refresh interval, such as at time T4, at which point the power is maintained at the fully-on level and the transceiver is transitioned back to full power mode.

The average power consumed during the low-power idle mode is much lower than in the nominal full power mode of 10G operation. For example, the power savings is approximately proportional to the duty cycle, which is N/(N+M). To provide a fast transition back to the nominal full power mode, the desired transition time is small. The transition time from LPI mode back to the nominal full power mode is approximately equal to the refresh period, N+M.

Despite the advantages of the existing low-power idle mode, there are some tradeoffs which decrease its effectiveness. For example, the receivers in the powered-down local and far-end transceivers require filter adaptation to train and maintain filter states (e.g., for filters such as Near End Crosstalk (NEXT) cancellers, Far End Crosstalk (FEXT) cancellers, equalizers and echo cancellers), as well as timing updates to maintain a timing lock with the Master transceiver. This adaptation and timing is strongly coupled with the transition time and power savings, because long and frequent adaptation intervals are desirable to allow accurate filter adaptation and timing lock, yet short and infrequent adaptation intervals are desirable to reduce power consumption. Furthermore, short quiet intervals are desirable to allow a short transition time, yet long quiet intervals are desirable to reduce power consumption. These factors create conflicts in design goals. However, existing inflexible low-power idle mode implementations do not allow flexibility in accommodating different receiver requirements, such as different durations and frequencies required for filter adaptation and timing lock. Furthermore, existing low-power idle mode implementations may create non-stationary noise (e.g. crosstalk from too-close cables) due to the frequent switching on and off of power during the low-power mode, which degrades the performance of adjacent ports of a transceiver. In addition, existing low-power idle mode implementations do not specify additional techniques which can provide additional power savings for a transceiver in low-power idle mode.

Accordingly, what is needed are systems and methods that provide low-power idle modes that permit greater flexibility in receiver architecture within desired restrictions of power savings and transition time, provide greater efficiency in the use of refresh periods, provide reduced noise, and/or provide additional power savings.

SUMMARY OF THE INVENTION

A low-power idle mode for a transceiver in a communication network is disclosed. In one aspect, a method for reducing power consumption of a transceiver connected to a communication network includes entering a low-power idle mode of the transceiver, and, in the low-power idle mode, repeatedly turning off a transmitter of the transceiver and turning on the transmitter according to a pattern, where the pattern has been customized based on characteristics of a receiver. While the transmitter is turned on, a control signal is transmitted from the transmitter to the network for reception by the receiver, and while the transmitter is turned off, no control signal is transmitted to the network from the transmitter, to conserve power consumed by the transceiver.

In another aspect, in a method for reducing power consumption of a transceiver, a turning off and turning on of plurality of transmitters in the transceiver is staggered such that only one of the transmitters is turned on at any time. In another aspect, in a method for reducing power consumption of a transceiver, a super-frame is provided including one or more idle frames, where the transmitter determines whether to transmit a control signal or not during an idle frame based on at least one characteristic of the transceiver. In another aspect, in a method for reducing power consumption of a transceiver, a wakeup signal is transmitted in one or more update frames to indicate that the transmitter is to exit low-power idle mode. Other aspects can provide other methods, systems and computer readable media for reducing power consumption of a transceiver.

The inventions disclosed herein provide low-power idle modes that can allow greater flexibility in receiver architecture within desired restrictions of power savings and transition time, greater efficiency in refresh periods, reduced noise, and/or additional power savings.

DETAILED DESCRIPTION OF PREFERRED EMBODIMENTS

The present invention relates generally to electronic communications, and more particularly to low-power operation of transceivers used for transmission and reception of data in networks. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 2:
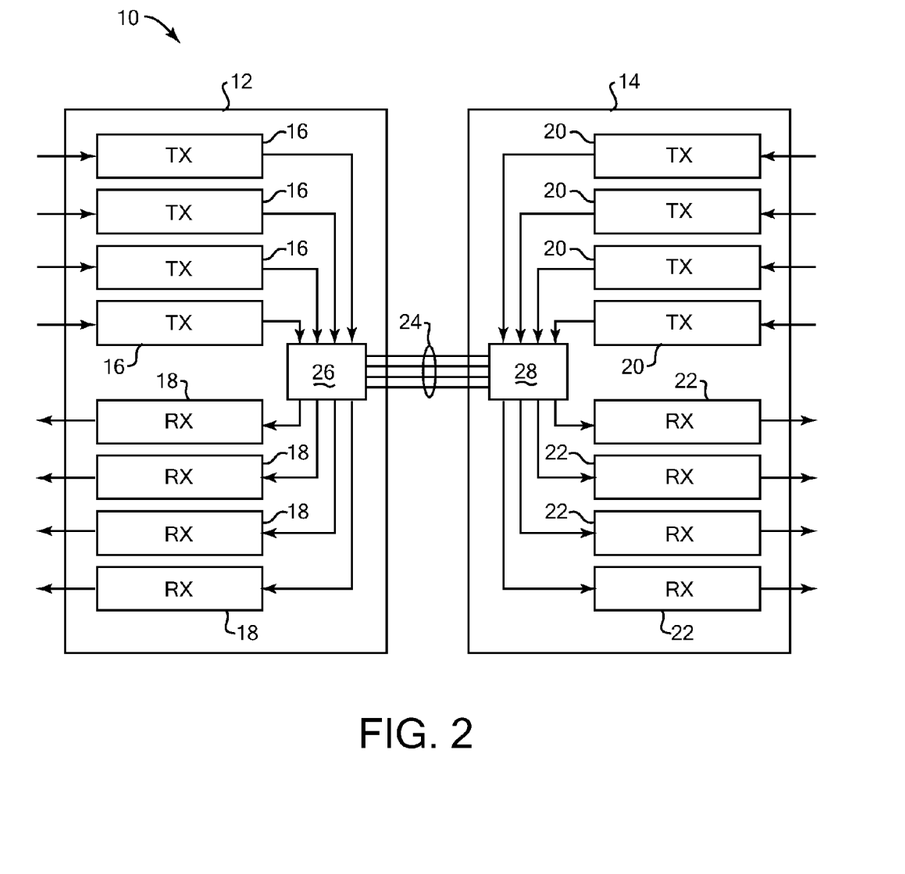
FIG. 2 is a block diagram illustrating a communication system suitable for use with the present invention.

FIG. 2 is a block diagram illustrating a communication system 10 suitable for use with the present invention. System 10 includes a first transceiver 12 and a second transceiver 14 which can communicate with each other. Transceiver 12 includes "transceiver components" including one or more transmitters 16 and one or more receivers 18. Similarly, transceiver 14 includes transceiver components including one or more transmitters 20 and one or more receivers 22. The transmitters 16 (and 20) shown in FIG. 1 can be considered individual "transmitters," as typically referenced herein, or can be considered individual transmitter channels which a transmitter block within the transceiver can independently transmit signals on. Similarly, receivers 18 (and 22) can be considered individual "receivers," as typically referenced herein, or can alternately be considered individual receiver channels which a receiver block within the transceiver can independently receive signals on. The transmitters 16 and 20 and receivers 18 and 22 are connected to one or more components (not shown) of a computer system, device, processor, or other "controller" associated with each respective transceiver which want to communicate data over the communication network. For example, transmitters 16 receive data and control signals from the controller connected to transceiver 12 in order to send the data over the network to other transceivers and controllers, while receivers 18 receive data from other transceivers and controllers via the network in order to provide the data to the controller connected to first transceiver 12.

The transceiver 12 can communicate with the transceiver 14 over one or more communication channels of a communication link 24. For example, for the 10GBase-T Ethernet standard, four communication channels are provided on link 24, each channel including a twisted pair cable. Thus, in that standard, there are four transmitters 16 and four corresponding receivers 18 provided in each of the transceivers 12 and 14, each transmitter associated with one of the local near-end receivers in the same transceiver, and each such transmitter/receiver pair dedicated to one channel used for duplex communication. A transmitter/receiver pair in one transceiver 12 communicates across a channel of link 24 to a far-end transmitter/receiver pair in transceiver 14. A transmitter 16 and a receiver 22 that are connected to the same channel/link, or two transceivers connected by the communication link 24, are considered "link partners."

An interface 26 can be provided in transceiver 12 and an interface 28 can be provided in transceiver 14 to allow data transmissions between the transceivers to be routed to the appropriate transceiver blocks. For example, interfaces 26 and 28 can include transformers to provide an open circuit inductance, and circuitry used for directing signals or data (alternatively, some or all circuitry can be included in other components, such as transmitters 16 and receivers 18).

In one example from the point of view of transceiver 12, data transmissions from a local transmitter 16 are provided to the interface 26, which outputs the data on a corresponding channel of the communication link 24. The data is received by the link partner, the transceiver 14. The interface 28 of transceiver 14 provides the received data to its receiver 22 connected to that same channel. Furthermore, due to noise effects such as near-end crosstalk and echo, the data transmitted by transmitters 16 is also received by the near-end receivers 18 in the same transceiver. Filters can be used to filter out this noise so that the receivers 18 receive only data from other transceivers 14.

The low-power idle mode of the present invention provides a refresh period, i.e., a duration in which one or more quiet intervals and refresh intervals are alternated. During a quiet interval, power consumption of link partner transmitter and receiver is reduced to a low level, while during a refresh interval, a transceiver component is turned on for a short time to transmit control signals, train or maintain an optimal state, or listen for a transition signal from a link-partner transceiver that causes the transceiver component to return to the nominal, fully active mode in which more power is consumed.

In some embodiments, the transceivers 12 and 14 are asymmetric, such that data transmitted by a local transmitter has no dependence or relation with data being received by the corresponding local receiver. Furthermore, the transmitter and receiver on either side of a link can be asymmetric so that both need not be in low power idle mode. In addition, a local transmitter and a corresponding local receiver for a channel can be in or out of low-power idle mode independently of each other. In some embodiments, all local transmitters (transmitter channels) in one transceiver are all in low power mode, or all in nominal, fully active mode, at the same time. Similarly, all local receivers (all receiver channels) can be either in LPI mode or in active mode at the same time. Each transceiver component can operate in a low-power idle mode of the present invention in response to determining that it will not be transmitting or receiving data.

Several conflicts and tradeoffs in the use of low-power idle mode exist. Factors include transition time from low-power idle mode to fully active mode, where a short quiet time and a short adaptation time are desired to allow a short transition time. Another factor is maintenance of the receiver in a "ready state," which is an optimal state that allows the receiver to resume full power operation in the minimal time without having to retrain filters or resynchronize timing. The maintenance of a receiver therefore includes adaptation of filters to an optimal state and maintaining a timing lock, where a long refresh time is desired to allow more accurate filter adaptation and a frequent refresh time is desired to maintain timing lock. Another factor is power consumption, where a longer quiet interval and a shorter refresh interval allow lower power consumption. For example, if the desired power savings during low-power idle is 90% of full power consumption, and the desired transition time is on the order of 10 us, then the refresh interval should be short, such as on the order of 1 us. The present invention allows greater flexibility in structuring quiet and refresh intervals of low-power idle mode to accommodate these and other factors in transceiver operation, as described in greater detail below.

Figure 3:
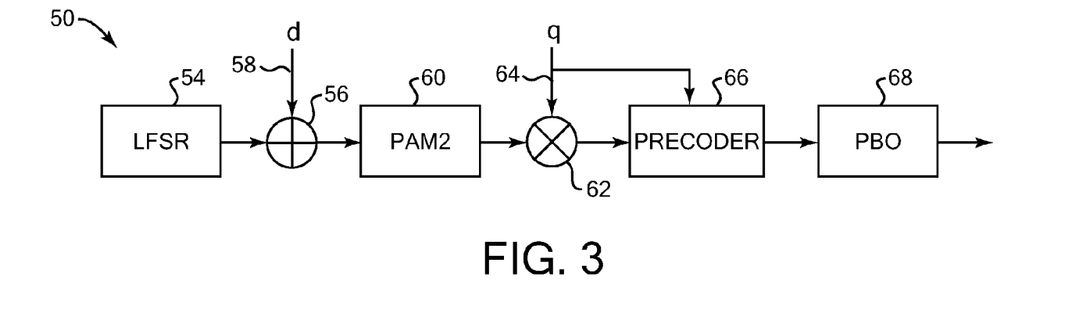
FIG. 3 is a block diagram illustrating a first embodiment of the present invention for a portion of a transmitter that can be used in a communication network for implementing a low-power idle mode of the present invention.

FIG. 3 is a block diagram illustrating a first embodiment of the present invention for a portion 50 of a transmitter that can be used in a communication network for implementing a low-power idle mode of the present invention. Transmitter portion 50 transmits signals to one or more link partner receivers that are connected to the transmitter via the communication network. Portion 50 is a simplified representation, and other well-known portions of the transmitter are not shown in FIG. 3, such as a digital to analog converter (DAC), clock generator, line driver, etc. Transmitter portion 50 of FIG. 3 is specific to an Ethernet 10GBase-T embodiment, but different, equivalent components can be used in other embodiments for different communication standards or implementations. Transmitter portion 50 can be implemented in hardware (e.g. one or more processors, memory, logic circuitry, etc.), in software, or in a combination of hardware and software.

In low-power idle mode, the transmitter has no actual data from a controller to transmit, and so a low-power idle mode control signal stream is created, e.g., by a transmitter component of the transceiver. In some embodiments, the control signal stream can be encoded using spread spectrum modulation. In the example embodiment shown, the control signal stream is created by a linear feedback shift register (LFSR) 54 which produces a pseudo-random sequence of bits. In some embodiments, a training LFSR 54 can be used. The output of the LFSR 54 is provided to an adder 56, which adds the bit stream to a control bit d provided on an input 58 to the adder. For example, the adder 56 can perform single-bit addition with the received bits to output a single bit output stream. In one example hardware embodiment, the adder 56 can be implemented with an XOR gate or operation. In the described embodiment, the control bit d controls whether or not the transmitter stays in a low power idle mode for each frame, e.g. for each particular bit value received by the adder 56 if there is one bit per frame. Thus, according to the example protocol of the present invention described below, the transmitter sets the control bit d to 1 if the current frame to be transmitted is desired to be a Wakeup frame, i.e. whether the transceiver now needs to go into full power operation, and is 0 otherwise. The values of the control bit d for different types of frames are described in greater detail below with respect to FIG. 4, and can be implemented using different values as appropriate for different embodiments.

The output of the adder 56 is provided to a pulse amplitude modulation (PAM) block 60. The PAM modulator 60 translates the bits of the bit stream to signal levels for transmission during the low-power idle mode. In some embodiments of the present invention, as shown in FIG. 3, PAM-2 modulation is used during low-power idle mode. For example, PAM-2 modulation translates the bits to either of two signal levels, e.g., +1 V and −1 V. PAM-2 modulation provides power savings advantages and is described in greater detail below. In other embodiments, any suitable modulation can be used, including the modulation used for a particular standard, such as DSQ128 (PAM-16) for Ethernet 10GBase-T communication. The PAM block 60 provides the modulated data to a mixer 62, which multiplies the data with a control signal q provided on an input 64 to the mixer. The signal q controls whether or not the transmitter is in a "quiet mode," i.e. the current frame is a Quiet frame, during which the transmitter does not transmit any data and conserves power. In the described example, if the signal q is 0, then the output of the mixer is zero, which causes the transmitter to not transmit any data. If the signal q is 1, then it is a non-quiet frame (e.g., an Update or Wakeup frame). The signal q thus changes based on how the quiet periods and refresh periods have been defined for the current communication; the transmitter determines the value of q based on what type of frame should be the current frame. The values of the signal q for different types of frames are described in greater detail below with respect to FIG. 4, and can be implemented using different values as appropriate for different embodiments.

Optionally, the signal output of the mixer 62 can be provided to a precoder 66 which can cancel interference known to the transmitter. For example, the 10GBase-T standard specifies that Tomlinson-Harashima Precoding (THP) can be used in transmission. If the precoder 66 is used, the signal q can also be provided to the precoder 64 to control the quiet intervals of the low power idle mode. The output of the precoder 66 is provided to a power back-off (PBO) block 68 which can be used to reduce output power to achieve a desired performance of the transmitter in transmitting the data (reduce interference or nonlinearity, etc.). The same power back-off level used in the normal, fully active mode (such as is standardized in 10GBase-T) can also be used during the low-power idle mode (e.g. during refresh intervals). The power backoff block 68 outputs the resulting signal on a corresponding channel to a link partner (and the signal is also typically received by the near-end receiver in the same transceiver). In some embodiments, the block 68 provides the signal to the interface 26 or 28 of the transceiver (not shown), which sends the signal to appropriate transceiver(s).

Figure 4:
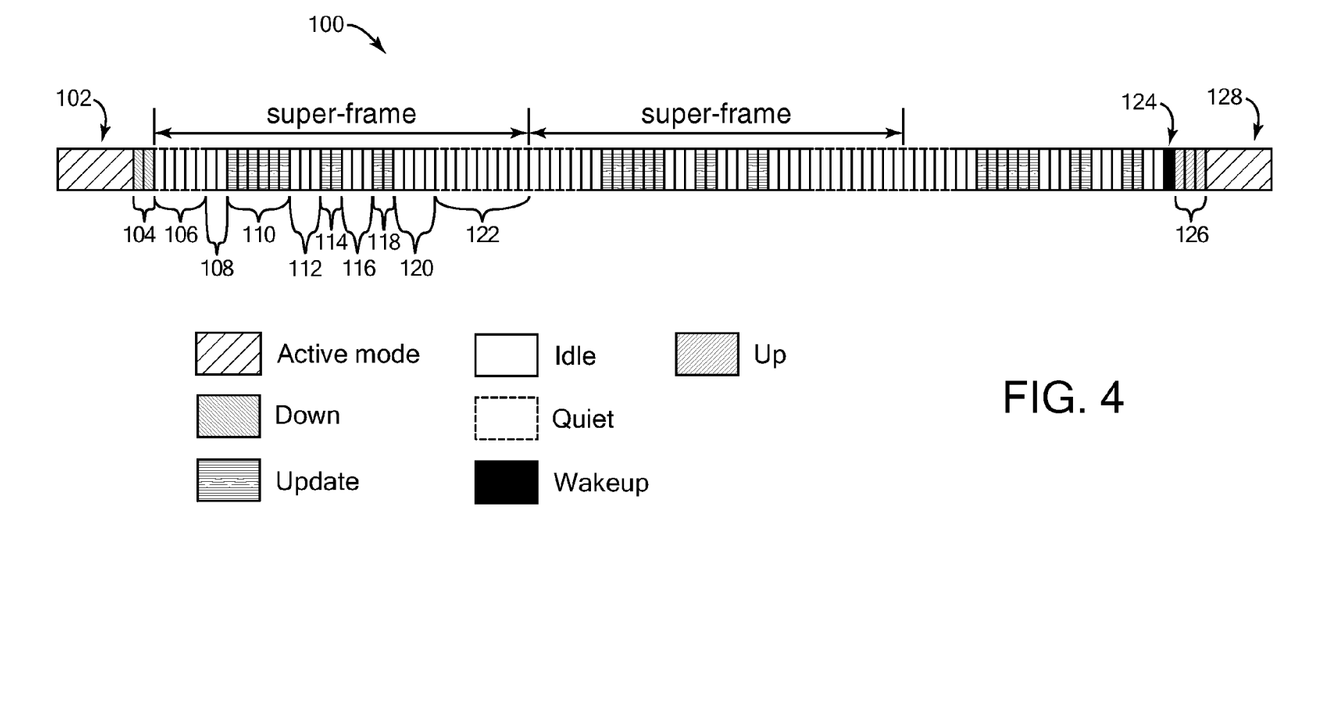
FIG. 4 is a diagrammatic illustration of an example protocol signal stream for the low-power idle mode of the present invention.

FIG. 4 is a diagrammatic illustration of an example pattern for a protocol signal stream 100 for the low-power idle mode of the present invention. Each frame of the stream 100 represents a unit of time. For example, in the 10GBase-T standard, a frame can be a Low Density Parity Check (LDPC) frame, which is 320 ns. Other frame types or durations can be used in other embodiments. In the described embodiment, each frame provides 1 bit of information, which indicates one of two things to a receiving transceiver: 1) stay in low-power idle mode, or 2) transition from low-power idle mode to full operation in fully active mode (e.g., Full 10G operation). Other embodiments can provide a different number of bits per frame or other suitable signalling; however, using 1 bit per frame in low-power mode and/or using 1 bit to signal a Wakeup frame can provide additional power savings.

The protocol of the present invention provides a number of types of frames that may be used to implement a low-power idle mode of operation for a transmitter of a transceiver. Different bit values or signals can be used in other embodiments to indicate the frames. The types of frames can include:

Down frame: A predefined number of Down frames are transmitted by a transmitter to indicate to a second, link partner receiver the desire of the transmitter to go into low-power idle mode. The link partner receiver examines the received value(s) of Down frames in order to recognize whether the transmitter is going into low-power idle mode. Multiple Down frames can be sent to ensure correct decoding of the Down frames. The Down frames may include any amount of information as needed for a particular embodiment.

Super-frame: A predefined sequence of frames which is sent periodically from the transmitter while the transmitter is in low-power idle mode. The super-frame can include a number of types of individual frames, including Quiet frames, Update frames, Idle frames, and Wakeup frames, and can be customized in format based on the characteristics of far-end and/or near-end receivers or other components of the transceivers or network. The construct of a super-frame can be similar or different for each of multiple transmission channels of the communication link (such as the four channels used for 10GBase-T). For some embodiments (such as the simplex communication described below), the number of frames in a super-frame can be made identical for all the channels.

Quiet frame: No transmission of signals is performed from the transmitter during a Quiet frame, i.e. the transmitter is "turned off" (powered down to a minimal allowed power level) to conserve power expenditure. (The receiver may or may not also be turned off during a quiet period, as described below). To provide a Quiet frame in the example embodiment of FIG. 3, the control bit d is 0, and the control signal q is 0.

Update (or Refresh) frame: The transmitter is turned on or kept on so that this type of frame is transmitted to be received by the link partner receiver to allow the link partner receiver to be maintained in a ready state, e.g., update its receiver filters and maintain a timing lock with the transmitter. Far-end filters, such as equalizers and FEXT cancellers, need to be adapted based on periodically received signals from a link partner transceiver, where the adaptation compensates for drift in the filters due to temperature changes in the receiver or other changes over time. These filters may, for example, compare received signals to known expected signals, and the filters are adapted accordingly. A timing lock must also be maintained between two link partners to allow a short transition time between low-power idle mode and fully active mode of a transceiver component (the receiver needs the timing lock, and also the far-end transmitter in some embodiments), and Update frames allow a link partner to continue to synchronize and lock timing relative to the other link partner. Furthermore, a local, near-end receiver also receives Update frames from the corresponding local transmitter in the same transceiver and can use these Update frames to update/adapt NEXT and Echo cancellers at the near-end receiver. To provide an Update frame in the example embodiment of FIG. 3, the control bit d is 0, and the control signal q is 1, such that the control signal transmitted is 0.

Idle frame: This frame can be chosen by the first transceiver to be either a Quiet frame (transmitting no signal), or an Update frame. The transmitter (or connected controller) can determine whether to use an Idle frame as a Quiet frame or an Update frame (the link partner receiver has no control over the use of an Idle frame and thus cannot assume it is either a Quiet frame or an Update frame). The transmitter can decide whether to transmit a control signal or not during an Idle frame based on the known characteristics of its corresponding near-end receiver of the transceiver. For example, a particular Idle frame can be useful to use as an Update frame to allow updates to the near-end receiver, such as adaptation and updates of Echo and NEXT cancellers at the local receiver that use the signals sent from the local transmitter to determine how to cancel echo and crosstalk caused by that transmitter. Such filters may be more complex than far-end filters such as FEXT cancellers, and thus may require additional Idle frames (beyond the number of actual Update frames) to complete filter updates. Based on the parameters of the super-frame, the transmitter knows whether additional Update frames will be needed for the near-end receiver, and sets particular Idle frames to Update frames as appropriate. Idle frames can also be used as Update frames to obtain additional time to update far-end receivers, in some embodiments. If the Idle frame is used as an Update frame, the transmitter is turned on or kept on and the Idle frame is transmitted like an Update frame.

For other Idle frames, the transmitter may know that the local receiver needs no additional Update frames during these Idle frames (e.g. the near-end receivers may need no further filter update time), and these Idle frames are set as Quiet frames to conserve power, in which the transmitter is turned off or kept off. In some embodiments, the transmitter can determine on the fly whether an Idle frame is to be used as Update frame or a Quiet frame. For example, logic in the local receiver may determine that an echo canceller requires more Update frames, so the receiver sends this information to the transmitter which then sets more appropriate Idle frames to Update frames; or if the logic identifies that the echo canceller is already at an optimal state, it can inform the transmitter that additional Update frames are not needed and that a particular Idle frame can be a Quiet frame. To provide an Idle frame in the example embodiment of FIG. 3, the control bit d is 0, and the control signal q is 0 or 1 (0 if Quiet, 1 if Update).

Wakeup frame: A Wakeup frame includes a Wakeup signal that is transmitted to indicate to the link partner receiver that the transmitter is going to return to fully active mode from low-power idle mode and that the link partner receiver needs to be ready for this transmission. In one aspect of the present invention, the Wakeup frame is transmitted by the transmitter using the same transmitting components of the transmitter as the Update/Idle frames. Thus, this aspect of the present invention allows the same signalling mechanism and method to be used both for transmitting refresh periods as well as wakeup signals. In this embodiment, a Wakeup frame is transmitted in place of a particular Update frame or Idle frame. The link partner expects and decodes the Wakeup frame at predefined frame periods within a super-frame. In the described embodiment, a Wakeup frame may only replace an Update frame or an Idle frame and may not replace a Quiet frame. Other embodiments can use Wakeup frames in other ways. To provide a Wakeup frame in the example embodiment of FIG. 3, the control bit d is 1, and the control signal q is 1, such that the signal transmitted is 1. In other embodiments, any suitable Wakeup signal can be used in a Wakeup frame.

Up frame: After the Wakeup frame, a predefined number of Up buffer frames are transmitted before the first transceiver enters fully active operation, to indicate to the link partner receiver that the transmitter is entering fully active mode. In some embodiments, the Up frames can hold the same values as the Wakeup frame (e.g. a value of 1 in the example embodiment of FIG. 3). Multiple Up frames can be sent to ensure correct decoding of the Up frames.

In FIG. 4, the types of frames described above are shown in an example pattern providing a sequence of frames to be transmitted by the transmitter to a link partner receiver. The transmitter is initially transmitting data in a fully active mode, such as in Full 10GBase-T operation, with active mode frames 102 to a link partner receiver over a channel of the communication link. At this time, the link partner receiver is receiving the data while in its own fully active mode. It is also assumed that particular parameters of the protocol, such as predefined amounts and sequences of particular types of frames in a super-frame, have already been negotiated or determined as is appropriate for the transceivers.

At some point, the transmitter determines that it will go into the low-power idle mode. The transmitter transmits a predetermined number of Down frames 104 to indicate to the link-partner receiver that the transmitter is going into low-power idle mode. In low-power idle mode, the transmitter transmits the predetermined super-frame, which allows the transmitter to be powered down for Quiet frames and requires it to be powered up and transmitting control signals for Update frames. In this particular example, the super-frame includes the following pattern of individual frames: 5 Quiet frames 106, 2 Idle frames 108, 6 Update frames 110, 3 Idle frames 112, 2 Update frames 114, 3 Idle frames 116, 2 Update frames 118, 4 Idle frames 120, and 9 Quiet frames 122. This pattern of frames causes a pattern of turning off and turning on the transmitter according to the type of frame being transmitted.

During the Quiet frames 106 the transmitter transmits nothing and is turned off (powered down to a minimal allowed power level), which allows power conservation at the transceiver. The Idle frames 108 can be used as Quiet frames or Update frames, allowing customization for different types of local receivers; if these frames are used as Update frames, the transmitter is turned on for each such frame. The transmitter is turned on (or kept on) to transmit the 6 Update frames 110 to allow the receiver to maintain its receiver in a ready state, e.g., adapt/update its filters and maintain the timing lock with the transmitter, and to allow the near-end receiver to update. For example, FEXT, NEXT, and echo cancellers can be adapted during the Update frames based on the signal received from the transmitter(s), to determine how to cancel echo and crosstalk caused by signal transmissions on the link 24. The 3 Idle frames 112 allow some flexibility for the transmitter to send more Update frames if needed after the 6 Update frames 110 to allow further receiver updates; otherwise, these frames are Quiet frames in which the transmitter is turned off. The 2 Update frames 114 are provided by the transmitter to allow the link partner receiver to maintain its timing lock with the transmitter. The 3 Idle frames 116 following the Update frames 114 allow flexibility for the transmitter to send more Update frames if needed; otherwise, they are Quiet frames. The following 2 Update frames 118 are sent by the transmitter to again allow the link partner receiver to maintain the timing lock, followed by the 4 Idle frames 120 which allow further flexibility to send more Update frames, if needed. Finally, the 9 Quiet frames 122 allow power conservation by the first transceiver.

The super-frame thus indicates the quiet and refresh intervals of the transmitter during the low-power idle mode. For example, the super-frame of FIG. 4 shows particular Quiet frames, during which the transmitter is in a quiet interval and turned off, and is not transmitting any signals. During the Update and Idle frames, the transmitter is turned on (or kept on from the previous frame being Update/Idle) and is in a refresh interval during which the transmitter transmits frames to the link partner receiver and the near-end receiver for receiver state maintenance. When the transmitter is in refresh intervals, transmitting Update and Idle frames, it is consuming power.

The super-frame is repeated twice more in the example of FIG. 4. In the third super-frame, the transmitter has determined that it should return to the fully active mode and leave the low-power idle mode. Thus, it sends a Wakeup frame 124 to notify the link partner receiver that it is leaving low-power idle mode. This Wakeup frame can be positioned at any of one or more predefined frame locations within a refresh interval of the super-frame so that the link partner receiver can examine those predefined locations to detect the Wakeup frame. The link partner receiver is in a low-power idle mode of its own, and will only be powered on and listening for Wakeup frames during refresh intervals. After the Wakeup frame 124, three Up frames are transmitted to ensure the link partner receiver knows of the transition. After the Up frames, the transmitter transmits data in the active mode with active mode frames 128.

A super-frame of the present invention allows a greater amount of flexibility compared to previous low-power idle implementations. For example, in prior proposed protocols, no flexible super-frame is used; rather, a rigid format must be used, consisting of a fixed amount of Update (refresh) frames, followed by a fixed amount of Quiet frames, and repeating this sequence (as shown in FIG. 1). Thus, in the prior proposal, a large, fixed amount of refresh frames were always transmitted to ensure that the filters could be updated, followed by a fixed amount of quiet frames to conserve power, and this sequence was repeated. This inflexible approach of using only longer and frequent refresh intervals in the prior proposals did not allow optimal use of refresh and quiet intervals for power conservation. This is because receiver filter adaptation and timing lock typically require different refresh durations and frequencies. For example, filter updates may require longer but less frequent refresh intervals, while maintaining a timing lock may require more frequent but shorter refresh intervals. These characteristics were not exploited in the prior proposals, and filter adaptation and timing locks were forced to always be performed within worst-case refresh intervals, thus expending more power than was necessary.

In contrast, the super-frame of the present invention allows the pattern of quiet intervals (Quiet frames) and refresh intervals (Update frames) to be customized as desired. The types of frames described above can be arranged in any desired sequence and number, e.g., to achieve a more efficient use of power and retain a small desired transition time, based on the different characteristics of receivers, such as filter adaptation and timing locks. The Update and Quiet frames need not be transmitted in a fixed repeating pattern, but can be arranged to accommodate the different requirements of different receivers. The pattern can be arranged based on a duration and a frequency of refresh intervals that optimizes (or increases efficiency of) the maintenance of one or more particular receivers in a ready state. Thus, the set of 6 Update frames in the super-frame example of FIG. 4 can provide a longer refresh interval to allow the filters to be adapted/updated (and timing lock maintained), but the longer interval occurs less frequently as allowed by this particular filter adaptation. In addition, the two later sets of the shorter refresh intervals of 2 Update frames in the example super-frame are more frequent to allow the timing to be synchronized, but are also short as allowed by the timing synchronization. This super-frame avoids always sending the larger amount of Update frames, which consumes more power. Furthermore, the Update and Quiet frames within a super-frame can be arranged in any desired pattern of sequence and number in different embodiments to accommodate a particular requirements of a link partner receiver (and/or a near-end receiver), such as a shorter filter adaptation or longer timing lock.

The use of the Idle frames of the present invention also allows design flexibility and efficient power conservation. Sending Update frames or Quiet frames in place of Idle frames, based on particular receiver characteristics, accommodates a large range of near-end receiver characteristics.

Thus, the present invention decouples the receiver's updates from the transition scheme, by imposing fewer restrictions on the receiver architecture. This provides better scalability, where the receiver updates are more independent of and minimally impact the power savings or the transition time, allowing more freedom for a designer as to how much power savings and transition time is provided in a communication system.

The receivers 18 and 22 of the transceivers 12 and 14 can be implemented in many different ways. Typically, a receiver (or a component before the receiver in the transmission stream) will have filters including echo cancellers, NEXT cancellers, and FEXT cancellers which cancel or reduce noise and allow the intended transmitted data to be determined from the received data stream. In the communication system of the present invention, each receiver can maintain synchronization with remote transmitters at the bit level, frame level, and super-frame level. If an embodiment is using a staggering, single-active channel technique (as described below with respect to FIGS. 7-8), then the receiver can also maintains synchronization at the transmit channel level.

A receiver is typically turned on so it can receive data in fully active mode. When it receives and recognized Down frames from the link partner transmitter, the receiver goes into its low-power idle mode. In low-power mode, the receiver is turned off during quiet intervals, and turned on periodically during refresh intervals to receive Update frames. Update frames are used by the receiver to update its filters and maintain a timing lock with the link partner transmitter. Idle frames are normally quiet but can optionally be used as Update frames, as determined by the transmitter; thus, the receiver cannot assume that any Idle frame is quiet or refresh.

The receiver resumes fully active mode when it detects a Wakeup frame indicating that the transmitter is returning to active operation and transmitting data. The Wakeup frame instructs the receiver to exit low-power idle mode and enter fully active mode so that it can receive transmitted data from the link partner. The receiver listens for a Wakeup frame within the super-frame from the link partner transmitter. A Wakeup frames is transmitted within a refresh interval and can be transmitted within specific, predetermined frames within a super-frame, which replace Update frames and/or Idle frames in a super-frame. The receiver decodes every frame that has been predefined to potentially be a Wakeup frame within a super-frame, to extract the information and determine if it is a Wakeup frame based on the extracted information. For example, one embodiments can define three particular Update frames to potentially hold a Wakeup signal, while other embodiments may define less or more (or all) Update or Idle frames as potential Wakeup frames. In the example embodiment shown in FIG. 3, a frame will hold a bit of 1 if it is a Wakeup frame and hold a bit of 0 if it is not a Wakeup frame.

Figure 5:
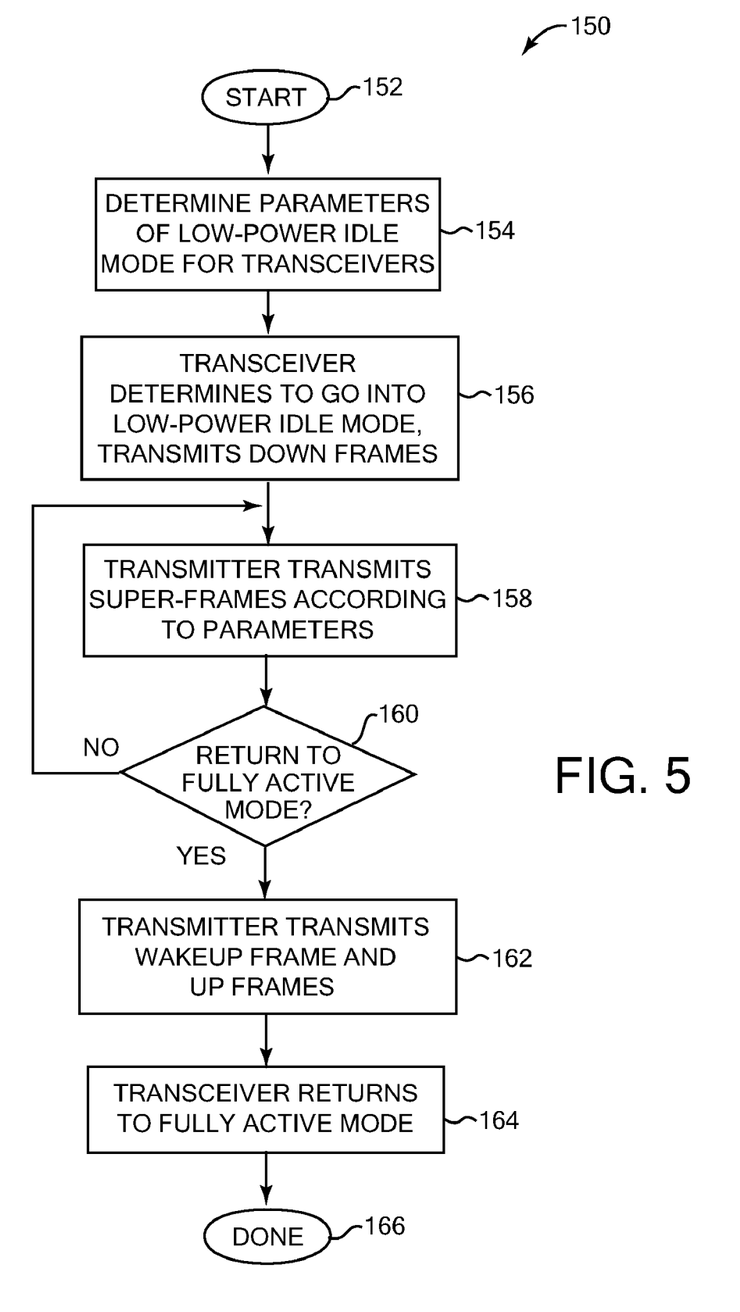
FIG. 5 is a flow diagram illustrating one embodiment of a method of the present invention for providing low-power idle mode for a transmitter.

FIG. 5 is a flow diagram illustrating one embodiment of a method 150 of the present invention for providing low-power idle mode for a transmitter. For explanatory purposes, the method describes a transmitter and a link partner receiver connected over a communication network. Method 150 (and 170, described below) can be implemented by one or more processors provided in a transceiver or connected to a transceiver (such as in a connected computer system or electronic device), and can be implemented using hardware, software, or both hardware and software. The methods can be implemented using a computer program product accessible from a computer readable medium providing program instructions or code for use by or implemented by a computer system or processor. A computer readable medium can be any apparatus that can contain, store, communicate, propagate, or transport the program for use by or in connection with the processor or computer system. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk (CD-ROM, DVD, etc.).

The method begins at 152, and in step 154, applicable transceivers on the network determine parameters for their low-power idle modes. Such parameters can include the frames which can be Wakeup frames, the number of Up or Down frames, the layout of the different types of frames in a super-frame in low-power idle mode, the use of THP or not in low-power idle mode, etc. In some embodiments, the parameters are predetermined before the transceivers are connected and cannot be changed. In other embodiments, the transceivers can auto-negotiate the parameters when they are connected via the network, and/or at other later times. For example, two transceivers can communicate their characteristics to each other and can decide on a number of Down frames, a number of Up frames, and/or a particular super-frame structure (including the pattern of Update, Idle, and Quiet frames, and which frames are Wakeup frames) that accommodates the particular filters of the transceivers and also efficiently allows a large number of quiet frames. In some embodiments, other low-power idle mode parameters can also be negotiated, such as the use of PAM-2 and/or THP or not in the low-power idle mode, whether THP is used in a per-frame basis, etc. (described in greater detail below). In some negotiation embodiments, some of these parameters can be predefined and fixed. In flexible, customizable super-frame embodiments as discussed above, the super-frame structure can be negotiated so that the advantages of flexibility can be fully realized.

After the determination of the parameters, the transmitter is assumed to be running in the fully active mode in this example method. In step 156, the transmitter determines to go into the low-power idle mode. This determination can be based on any of a variety of different causes or events. For example, a controller (such as a computer system, device, processor, etc. connected to the transmitter) may determine that it will not need to transmit data for a long period of time (e.g. over a threshold period of time). In step 158, the transmitter transmits super-frames including multiple frames from its transmitter during its low-power idle mode, the super-frames constructed according to the parameters determined in step 154. These super-frames can include Update and Quiet frames, and Idle frames in some embodiments, as described above with reference to FIG. 4. During the Quiet frames, no control signals are is actually transmitted, allowing conservation of power.

In step 160, the process checks whether the transmitter should return to the fully active mode. This change of mode can be triggered by any of a number of different causes or events. For example, the connected controller may determine that it needs to transmit new data to the link partner receiver, and to transmit such data, the transmitter needs to be in fully active mode. If the transmitter will not return to fully active mode, then the process returns to step 158. Otherwise, a return to fully active mode is initiated at step 162, in which the transmitter transmits a Wakeup frame and Up frames to the link partner receiver to indicate its return to active mode. In step 164, the transmitter has returned to fully active mode and can transmit data, and the process is complete at 166. The process can initiate step 156 if the transmitter again determines that it can go into low-power idle mode to conserve power.

Figure 6:
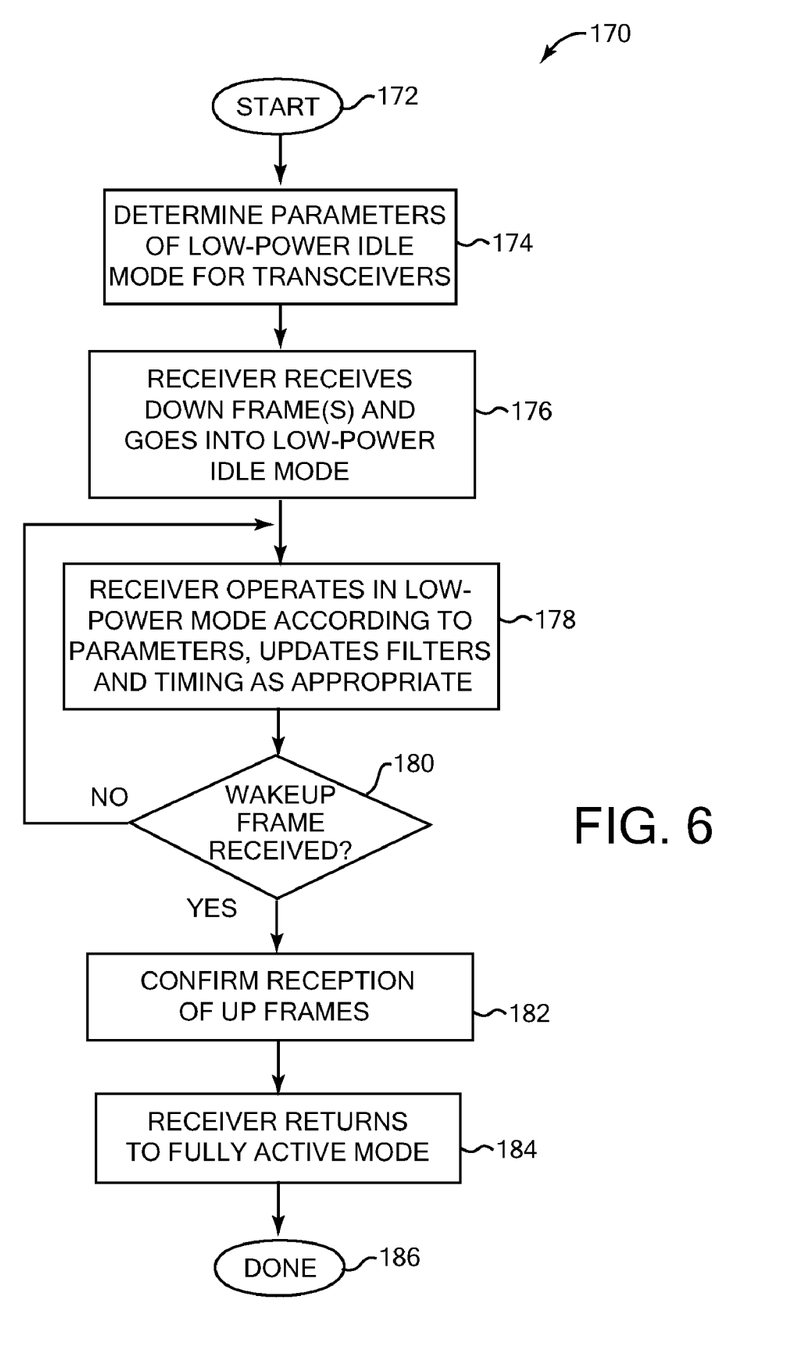
FIG. 6 is a flow diagram illustrating one embodiment of a method of the present invention for providing low-power idle mode for a receiver.

FIG. 6 is a flow diagram illustrating one embodiment of a method 170 of the present invention for providing low-power idle mode for a receiver. The method begins at 172, and in step 174, applicable transceivers on the network determine parameters for their low-power idle modes. Such parameters can include the frames which can be Wakeup frames, the number of Up or Down frames, the layout of the different types of frames in a super-frame in low-power idle mode, etc. As in the method of FIG. 5, the parameters may be predetermined before the transceivers are connected and cannot be changed, or the transceivers can auto-negotiate some or all of the parameters when they are connected via the network and/or at other later times.

After the determination of the parameters, the receiver is assumed to be running in the fully active mode in this example method. In step 176, the receiver determines to go into the low-power idle mode. This occurs when the receiver receives Down frames from the far-end transmitter, indicating that the transmitter is going into low-power idle mode. In step 178, the receiver operates in low-power idle mode according to the parameters determined in step 174. This includes powering up during a refresh interval to receive an Update frame from the link partner transmitter (or to receive an Update frame from any near-end transmitter if that near-end transmitter is in low-power idle mode). The receiver uses the Update frames to update filters (such as Echo, NEXT, and FEXT cancellers) and to maintain a timing lock with the link partner transmitter. If the current frame is a Quiet frame in a quiet interval, no signal has been transmitted, the receiver can turn off at step 178 and conserve power.

In step 180 (e.g. for each received frame), the process checks whether the receiver should return to the fully active mode, which is determined by whether the receiver has detected a Wakeup frame from the link partner transmitter. This indicates that the link partner transmitter is going to transmit data to the receiver and so the receiver should be in fully active mode to receive the data. If no Wakeup frame is received, the process returns to step 178 to receive the next frame. If a Wakeup frame has been detected, then in step 182 the receiver confirms the reception of the predetermined Up frames, and in step 184 the receiver returns to fully active mode to begin receiving data from the link partner transmitter. The process is then complete at 186. The process can initiate step 176 if the receiver again determines that it can go into low-power idle mode to conserve power.

Figure 7:
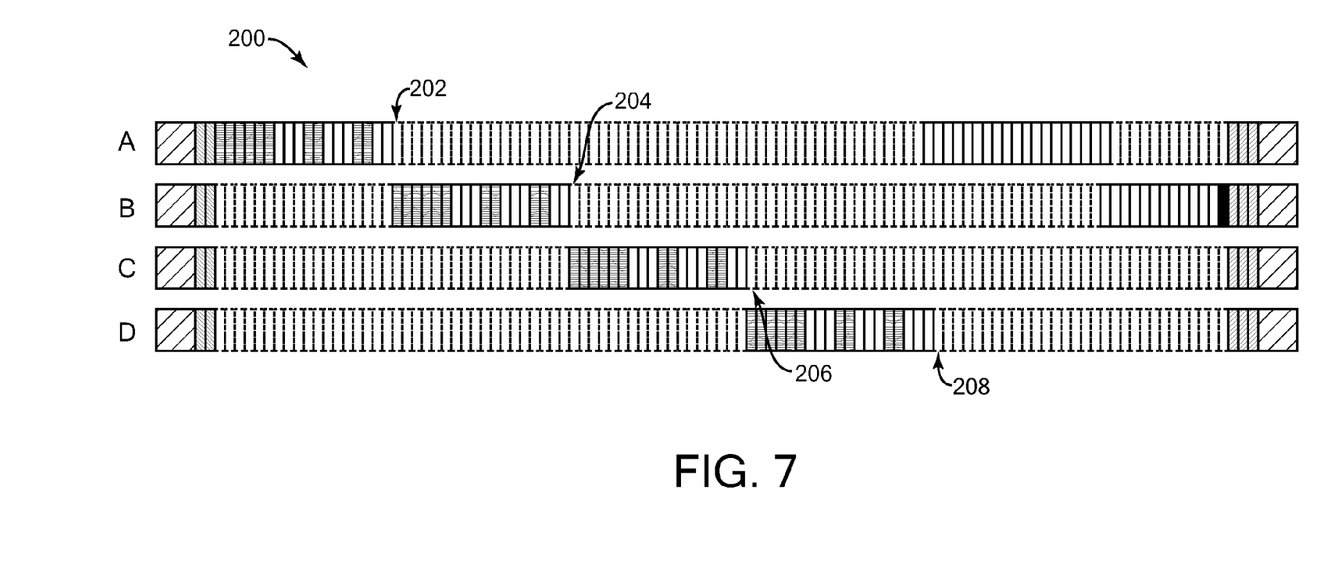
FIG. 7 is a diagrammatic illustration of another embodiment of the low-power idle mode of the present invention, in which one channel at a time is used to transmit signals.

FIG. 7 is a diagrammatic illustration of another embodiment 200 of the low-power idle mode of the present invention, in which one channel at a time is used to transmit control signals. As shown in FIG. 1, multiple channels may be available to transmit data by a transceiver, where each channel has its own pair of transmitter and receiver at each end of the link. For example, the 10GBase-T standard provides four channels which can be used. The embodiment of FIG. 7 allows a collective use of the multiple channels for transmission to conserve additional power, by activating only one channel at a time for transmission and keeping the other transmit channels quiet for power conservation, and then sequencing this channel use for each of the other transmission channels at different times. This transmission using only one active channel at a time is performed when all local transmitters are in low-power idle mode. In the example of FIG. 7, low-power mode super-frames are used as described above for the embodiment of FIG. 4. Other embodiments can used other types or arrangements of refresh and quiet intervals.

The embodiment of FIG. 7 provides a refresh period in the four different channels at different, sequential times based on the refresh interval during low-power idle mode. For example, as shown in FIG. 7, when four transmit channels are available, the first channel A can be used to transmit a refresh interval including a super-frame of Update and Idle frames (after two Down frames). At the same time, channels B, C, and D are kept quiet and are not providing Update or Idle frames, and so their transmitters are conserving power. After the refresh interval on channel A, at frame 202 Quiet frames have begun on channel A. In addition, the refresh interval, including Update and Idle frames, begins on channel B at this time. Similarly, the Update and Idle frames of channel B have finished by frame 204, and Quiet frames are provided on channel B and a refresh interval starts on channel C. Likewise, at frame 206 Quiet frames are provided on channel C, and the refresh interval starts on channel D. After the last Update/Idle frame of the refresh interval on channel D, Quiet frames start on channel D starting with frame 208, and the next refresh interval starts on channel A.

This technique for activating only one transmitter and transmit channel at a time (and thus turning off the transmitters in the transceiver for the other channels) can significantly increase power savings for the transceiver. For example, about 75% additional power savings can be obtained. This is due to the fact that the transmitter for only one channel uses power at a time and thus only one of the multiple transmitters is using power at a time, instead of four transmitters and receivers (or other plural amount). This allows more Quiet frames to be used on each channel, saving power overall. A long quiet interval is provided on each channel, which normally would not be possible due to the timing recovery/lock requiring more frequent refresh intervals. However, a refresh period on any one of the channels allows the timing lock to be maintained for all channels (timing recovery is shared among all channels), and since the refresh periods are staggered, the refresh periods occur frequently enough to maintain timing lock.

Figure 8:
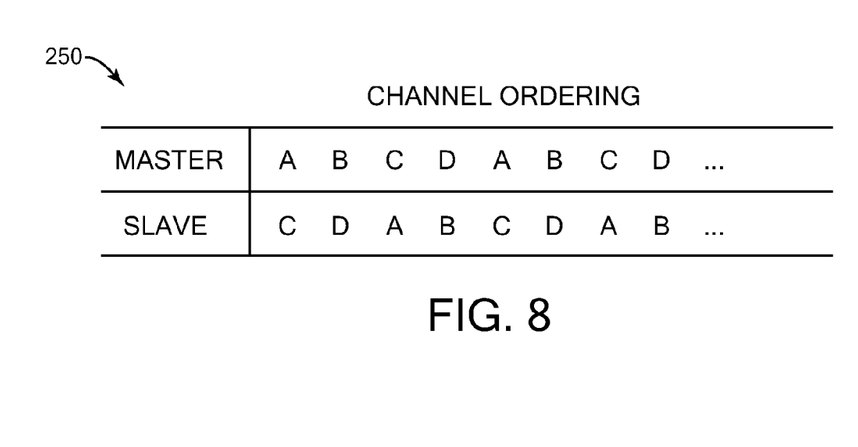
FIG. 8 is a table illustrating another embodiment of the low-power idle mode of the present invention for achieving additional power savings and simplifying the communication system.

FIG. 8 is a table 250 illustrating another embodiment of the low-power idle mode of the present invention for achieving additional power savings and simplifying the communication system. In this embodiment, simplex communication (signal transmission in one direction on a channel at a time) is used to obtain additional power savings, instead of the standard duplex communication used in standards such as 10GBase-T.

The simplex communication is used when both link partner transceivers of a communication link are in low-power idle mode and are synchronized in their use of channels. Both link partners can go into low-power idle mode at approximately the same time, or one link partner can go into low-power idle mode first, followed by the other link partner and then channel order is synchronized between them. Only one of the transmit channels is used at a time and only one of the receive channels is used at a time in this simplex communication embodiment (which is not possible in fully active mode in which all channels are used). Thus, the simplex communication is preferably used in conjunction with the method of using staggered refresh intervals as shown in the embodiment of FIG. 7, which uses one active transmit channel at a time.

The simplex communication of this embodiment provides a further ordering of Master and Slave channels (Master and Slave being designations of the two linked transceivers). This further ordering guarantees simplex communication and that no overlap (duplex) communication occurs. In this example, it is assumed that the staggering of the transmissions on the channels is performed so that "adjacent" channels A, B, C, and D are active in that order for each direction, as in FIG. 7. Table 250 includes a channel ordering for a particular transceiver being a Master that transmits signals over a channel, and the link-partner transceiver being a Slave that transmits signals over a different and non-adjacent channel at the same time. Thus, there is only one transmit channel and only one receive channel (a different one) active at the same time. (FIG. 7 shows the transmit channels only). From the perspective of one transceiver, Channel A is used to transmit a super-frame from a first transmitter as Master, while channel C is used to receive a super-frame at the third receiver from the Slave. Next, channel B is used to transmit a super-frame from the second transmitter as Master, while channel D is used to receive a super-frame at the fourth receiver from the Slave. Then channel C is used for the Master and channel A for the Slave, channel D for Master and channel B for Slave, and so on. Thus, the simplex communication is ordered among the channels such that when one of the channels is used as a master transmit channel, a non-adjacent channel to the master channel is used as a slave transmit channel. The far-end transceiver is coordinated with the near-end transceiver so that channels are staggered synchronously.

This use of sequential Master and Slave having an unused channel between them guarantees simplex operation for the channels, since it prevents overlaps in use from Master and Slave (e.g., if adjacent channels were used sequentially, such as Master on A and Slave on B, there would be a chance that an adjacent channel might have an overlap of use for Master at the same time as Slave (duplex operation), e.g. on Channel B when the Master was moved to B and the Slave moved to C). The simplex communication embodiment also assumes that the same length of super-frame is used by all the link partners, in order to guarantee the simplex operation of these embodiments.

Simplex communication as described above can allow a simpler receiver to be used in the transceivers that will reduce power consumption of the components. For example, no Echo or FEXT cancellers are needed, and only total 1 NEXT canceller and 1 feed forward equalizer (FFE) may be needed at one time. In a 10GBase-T embodiment, each channel requires one Feed Forward Equalizer (FFE), one Echo canceller, three NEXT cancellers (three transmitters to one receiver), and three FEXT cancellers. Thus, the non-use of the Echo and FEXT cancellers, and most of the NEXT cancellers and FFEs, greatly simplifies the receiver components of the transceivers. The unused cancellers and equalizers can be turned off during this low-power idle mode embodiments, which reduces power consumption.

Figure 9:
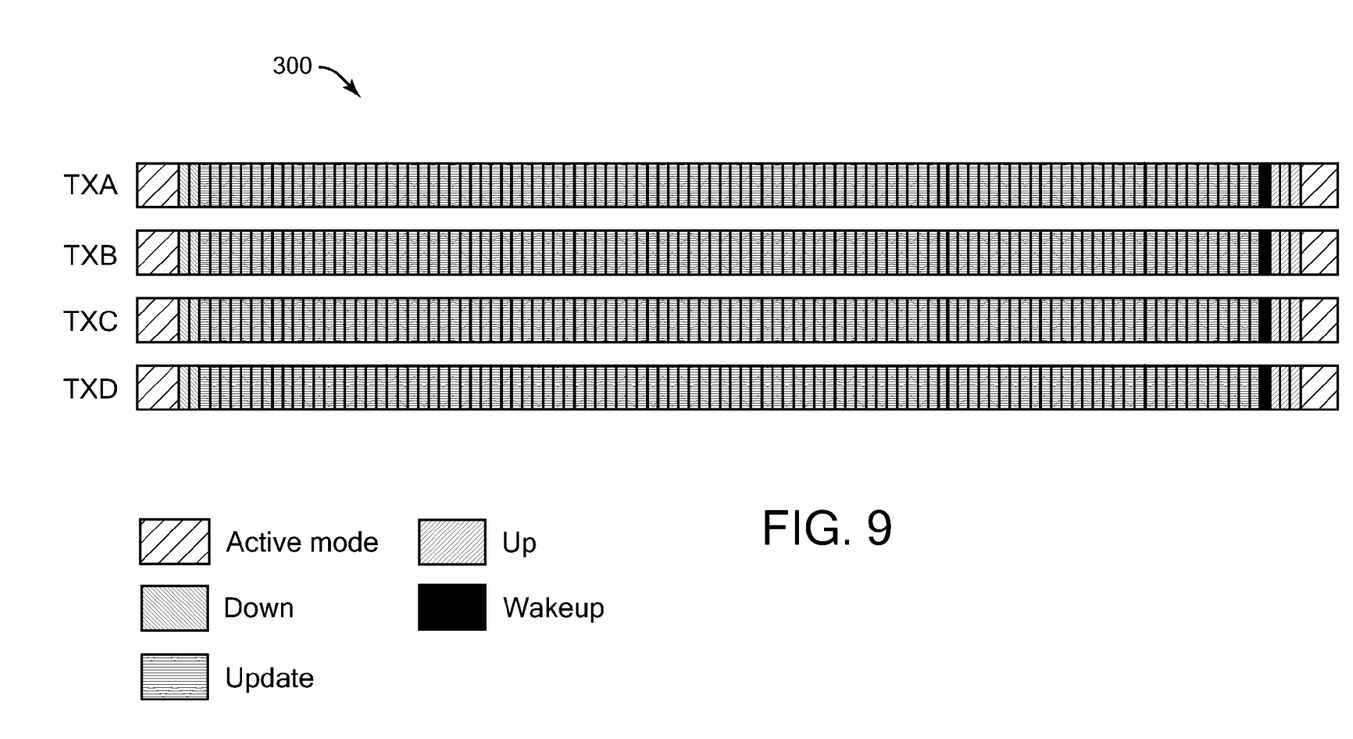
FIG. 9 is a diagrammatic illustration of another embodiment of the low-power idle mode of the present invention for achieving reduced crosstalk.

FIG. 9 is a diagrammatic illustration of another embodiment 300 of the low-power idle mode of the present invention for achieving reduced crosstalk. This embodiment can be used on its own for a transceiver, or with one or more of the other embodiments described herein as appropriate. For example, the operating mode of FIG. 9 can be used selectively in a communication system when needed, e.g., when noise from non-stationary crosstalk is expected to increase above a predetermined threshold amount such that it becomes a limiting factor for link performance.

In the embodiment of FIG. 9, the transmitters on all four channels 302, 304, 306, and 308 are kept on all the time. One way to implement this constant active status is to define the super-frame as having all Update frames and no Quiet or Idle frames, as shown in FIG. 9.

When not using the embodiment of FIG. 9, low-power idle mode may create a non-stationary (time-varying) noise environment due to the constant alternating between quiet and refresh periods in which control signals are not transmitted and then transmitted (as in the embodiments described above). This alternating transmission creates crosstalk on the channels which fluctuates over time, and thus is non-stationary. For example, a non-stationary noise environment can cause 0.5 dB of signal-to-noise ratio (SNR) loss from the non-stationary characteristic.

The constant transmission of FIG. 9 for this embodiment of the present invention prevents the fluctuation in crosstalk and other noise occurring in other low-power idle modes. The elimination of the alternating quiet and refresh intervals provides a stationary alien crosstalk environment for neighboring ports on a transceiver, thus reducing or eliminating the non-stationary crosstalk typically observed in previous low-power idle modes. The stationary crosstalk environment provides constant crosstalk which can be better adapted to and reduced by the receiver than the non-stationary crosstalk.

Keeping all transmitters on all the time will consume more power than if the transmitters are turned off during quiet periods. However, the receivers need not be kept on all the time like the transmitters. For example, a receiver can be turned on periodically according to a refresh period to update itself with received frames and to look for Wakeup frames, as in the embodiments described above, and thus conserve power. Furthermore, additional desired power savings can be achieved in other ways to compensate for the increased power consumption, such as with one or more of the techniques described below.

Other techniques can be used in embodiments of the present invention to reduce power consumption and/or simplify the components. These techniques can be used in their own embodiments, or can be combined with any of the above embodiments or with each other, as appropriate. Several of the embodiments allow a receiver to be simplified, resulting in more performance margin allowing reduction of power consumption of the receiver.

In some embodiments, PAM2 modulation can be used during low power idle mode to simplify the receiver significantly. PAM2 distinguishes only two distinct signal levels, which is much less than the 16 distinct signal levels used by DSQ128, the standard modulation used in 10GBase-T. PAM2 thus allows more margin to simplify the receiver components. For example, the feed forward equalizer (FFE) can be shorter/simpler, no crosstalk cancellers may need to be used, and a simpler/lower power analog front end (AFE) can be used. When using PAM2, the transmitter is not as noisy as in normal operation as when using DSQ128. The AFE (including components such as, for example, a digital to analog converter (DAC) and line driver for the transmitter path, and a low pass filter, gain stage, and analog to digital converter (ADC) for the receiver path) consumes a relatively large amount of power, since noise is desired to be reduced; however, reasonable performance can often still be achieved if the noise floor is raised with a simplified AFE.

In some embodiments, THP precoding can be deactivated or turned off during low-power idle mode (e.g., during low-power idle mode or only during refresh intervals of the low-power idle mode). In some embodiments, the use of THP during low-power idle mode can be negotiated between transceivers when they connect to the network. The deactivation of THP allows the implementation of the Echo and NEXT cancellers to be simplified, thus reducing power consumption. For example, without the THP precoding, the input to the Echo and NEXT cancellers is known to be a few discrete values provided from the PAM-2 modulation, which can simplify the Echo and NEXT cancellers. A disadvantage is that non-linearity in the analog components of the transceiver may not be detected, and filter adaptation may behave differently under non-THP operation. During fully active mode, THP and thus more complex Echo/NEXT cancellers are used. In one example, two blocks or versions of each Echo and NEXT canceller can be provided in a receiver: simple and complex versions. When THP is active, then the more complex cancellers implemented for a large number of levels can be used, with the simpler versions turned off. During low-power idle mode, when THP is turned off, the simpler version of the cancellers can be used, which consumes less power, and the more complex versions are turned off.

In some embodiments, the THP precoding can be turned off for all frames transmitted during low-power idle mode. In other embodiments, THP precoding is turned off only for some of these frames, e.g. at a per-frame basis. For example, the transmitter can perform or not perform THP precoding for each frame transmitted during low-power idle mode, based on predefined parameters that indicate this information for each frame. In some embodiments, the transceiver can auto-negotiate with other transceivers as to which frames during low-power idle mode are to have THP precoding, and which frames are not.

The combination of PAM2 modulation and elimination of THP precoding in low-power idle mode can provide even greater power savings, because the PAM2 modulation only provides two values (+1 and −1) to the Echo and NEXT cancellers, thus simplifying them to a greater degree and allowing more power conservation.

Some embodiments of the present inventions use 1 bit per frame in the low-power idle mode, as described above. This allows a reduction of power, since many less bits per frame need be sent than in fully active mode which may use multiple bits per frame, such as the nominal full power mode of 10G operation that uses DSQ128 modulation with 256 bits per LDPC frame.

Some embodiments can remove the need for a parity check such as Low Density Parity Check (LDPC) during low-power idle mode (especially when using PAM-2 instead of a more complex modulation, since PAM-2 would not use LDPC). LDPC encoding and decoding is used in the 10GBase-T standard, but the decoding can be turned off in the receiver in low-power idle mode to simplify the receiver, encoding can also be turned off in the transmitter, which provides more margin to reduce power consumption.

The embodiments of the present invention provide significant advantages in an extended low-power idle mode for transceivers on a communication network. Greater power savings can be achieved with more efficient use of quiet and refresh intervals. Furthermore, various receiver architectures and implementations are accommodated, allowing power savings to be more efficiently tuned to the particular characteristics of different types of receivers, and allowing more independence of filter adaptation from power consumption and transition time, permitting design freedom to determine a desired power savings and transition time. In addition, the embodiments of the invention allow asymmetry between link partners. For example, link partners can go into low-power mode independently, and can choose different sets of parameters for low-power idle mode. Further embodiments allow additional power savings through the use of one or more of techniques such as providing one active channel at a time, providing staggered, simplex communication, and using processing that allows simplified components, such as PAM2, no THP, and no LDPC. In some embodiments, a stationary crosstalk environment can be maintained, thus reducing or eliminating non-stationary crosstalk that may be present in low-power idle modes.

Although the present invention has been described in accordance with the embodiments shown, one of ordinary skill in the art will readily recognize that there could be variations to the embodiments and those variations would be within the spirit and scope of the present invention. For example, other network standards can be used with the embodiments shown where similar requirements are applicable. Accordingly, many modifications may be made by one of ordinary skill in the art without departing from the spirit and scope of the appended claims.

What is claimed is:

1. A method for reducing power consumption of a transceiver connected to a communication network, the method comprising:
    entering a low-power idle mode of the transceiver; and
    in the low-power idle mode, repeatedly turning off a transmitter of the transceiver and turning on the transmitter according to a pattern, wherein while the transmitter is turned on, a control signal is transmitted from the transmitter to the network for reception by a receiver, and while the transmitter is turned off, no control signal is transmitted to the network from the transmitter to conserve power consumed by the transceiver, and wherein the pattern has been customized based on characteristics of the receiver.

2. The method of claim 1 wherein the pattern has been customized based on a duration and a frequency that the receiver requires for the transmitted control signal to be received by the receiver in order to maintain the receiver in a ready state for a later fully active mode.

3. The method of claim 2 wherein the maintaining the receiver in a ready state includes updating at least one filter of the receiver.

4. The method of claim 3 wherein the at least one filter includes a Far End Crosstalk (FEXT) canceller.

5. The method of claim 2 wherein the maintaining the receiver in a ready state includes maintaining a timing lock of the receiver relative to the transmitter.

6. The method of claim 1 wherein the turning off of the transmitter provides a quiet interval and the turning on of the transmitter provides a refresh interval, and wherein the pattern includes providing at least one quiet interval and a plurality of refresh intervals, at least two of the refresh intervals having different durations.

7. The method of claim 1 wherein the pattern is provided as a super-frame including a plurality of frames implementing the pattern, wherein the frames in the super-frame include one or more quiet frames in which no control signal is transmitted and one or more update frames in which the control signal is transmitted to the receiver.

8. The method of claim 7 wherein the super-frame provides a pattern of the frames that includes a first amount of the update frames, which are followed by a plurality of the quiet frames, and which are followed by a second amount of the update frames, wherein the first amount is different than the second amount.

9. The method of claim 7 wherein the super-frame includes one or more idle frames, wherein the transmitter determines whether to transmit the control signal or not during an idle frame based on at least one characteristic of a near-end receiver of the transceiver.

10. The method of claim 9 wherein the transmitter determines whether to transmit the control signal or not during an idle frame based on whether near-end filters of a near-end receiver of the transceiver require updating to maintain a ready state for a later fully active mode, wherein the near-end receiver is turned off and turned on in conjunction with the transmitter.

11. The method of claim 1 further comprising transmitting a wakeup signal while the transmitter is turned on, the wakeup signal indicating to the receiver that the transceiver is exiting the low-power idle mode.

12. The method of claim 1 wherein the pattern is customized based on a negotiation of parameters performed by the transmitter and the receiver before the low-power idle mode is entered.

13. The method of claim 1 wherein the transmitter and the receiver communicate according to an Ethernet 10GBase-T standard.

14. The method of claim 1 further comprising deactivating a precoding block of the transmitter such that the precoding of the transmitted control signal is not performed in the low-power idle mode.

15. The method of claim 14 wherein a modulation block in the transmitter uses PAM-2 modulation during the low-power idle mode, and wherein the precoding block includes a Tomlinson-Harashima Precoding (THP) block.

16. The method of claim 1 wherein the transmitter is one of a plurality of transmitters included in the transceiver, and further comprising selecting the plurality of transmitters to be turned on all the time during the low-power idle mode to reduce noise created from a non-stationary crosstalk provided from the turning off of the transmitter.

17. A method for reducing power consumption of a transceiver connected to a communication network, the method comprising:
   entering a low-power idle mode of the transceiver; and
   in the low-power idle mode, repeatedly turning off a transmitter of the transceiver and turning on the transmitter according to a pattern, wherein while the transmitter is turned on, a control signal is transmitted from the transmitter to the network for reception by a receiver, and while the transmitter is turned off, no control signal is transmitted to the network from the transmitter to conserve power consumed by the transceiver,
   wherein the pattern is provided as a super-frame including a plurality of frames implementing the pattern, the frames in the super-frame including one or more quiet frames in which no control signal is transmitted, one or more update frames in which the control signal is transmitted to the receiver, and one or more idle frames, wherein the transmitter determines whether to transmit the control signal or not during an idle frame based on at least one characteristic of the transceiver.

18. The method of claim 17 wherein the transmitter decides whether to transmit the control signal or not during an idle frame based on whether near-end filters of a near-end receiver require updating to maintain a ready state for a later fully active mode.

19. The method of claim 18 wherein the near-end filters of the transceiver include at least one echo canceller and at least one Near-End Crosstalk (NEXT) canceller.

20. A method for reducing power consumption of a transceiver connected to a communication network, the method comprising:
   entering a low-power idle mode of the transceiver; and
   in the low-power idle mode, repeatedly turning off a plurality of transmitters of the transceiver and turning on the plurality of transmitters according to a pattern, wherein the turning off and the turning on of the plurality of transmitters is staggered such that each of the transmitters is turned on and only one of the transmitters is turned on at any time, wherein while the one transmitter is turned on, a control signal is transmitted from the one transmitter to the network for reception by a receiver, and while a particular transmitter is turned off, no control signal is transmitted to the network from the particular transmitter to conserve power consumed by the particular transceiver.

21. The method of claim 20 wherein the pattern is implemented by a plurality of frames, wherein the frames include one or more quiet frames in which no control signal is transmitted and one or more update frames in which the control signal is transmitted for the receiver, wherein the update frames are staggered such that only one of the transmitters is active at any time.

22. The method of claim 20 wherein simplex communication is used between the transceiver and a different transceiver connected to the network.

23. The method of claim 22 wherein the transmitter is one of a plurality of transmitters included in the transceiver, and wherein each transmitter transmits a control signal on a different channel at a different time, such that simplex communication is used on each channel.

24. The method of claim 23 wherein the transceiver includes a plurality of receivers corresponding to the plurality of transmitters, and wherein while one of the transmitters is transmitting a control signal on one of the channels, one of the receivers is receiving a different control signal on a different one of the channels.

25. The method of claim 24 wherein the plurality of transmitters are four transmitters, the plurality of receivers are four receivers, and each of four channels is connected to a different pair of the transmitters and receivers, and wherein the simplex communication is ordered among the channels such that a first channel is used as a transmitting channel while a third channel, non-adjacent to the master channel, is used as a corresponding receiving channel.

26. A method for reducing power consumption of a transceiver connected to a communication network, the method comprising:
   entering a low-power idle mode of the transceiver; and
   in the low-power idle mode, repeatedly turning off a transmitter of the transceiver and turning on the transmitter according to a pattern, wherein while the transmitter is turned on, a control signal is transmitted from the transmitter to the network for reception by a receiver, and while the transmitter is turned off, no control signal is transmitted to the network from the transmitter to conserve power consumed by the transceiver, and wherein the pattern is provided as at least one super-frame including a plurality of frames implementing the pattern, the frames in the super-frame including one or more quiet frames in which no control signal is transmitted and one or more update frames in which the control signal is transmitted for the receiver, and wherein a wakeup signal is transmitted in one of the update frames to indicate that the transmitter is to exit low-power idle mode.

27. The method of claim 26 wherein the receiver listens during predefined frames of the one or more update frames for the wakeup signal.

28. The method of claim 27 wherein the pattern and the predefined frames are customized based on a negotiation of parameters performed by the transmitter and the receiver before the low-power idle mode is entered.

29. A transceiver including a mode for reducing power consumption, the transceiver connected to a communication network, the transceiver comprising:

a transmitter operative to transmit data on the communication network; and a near-end receiver operative to receive data from the communication network, wherein the transceiver includes a low-power idle mode in which the transmitter is repeatedly turned off and turned on according to a pattern, wherein while the transmitter is turned on, a control signal is transmitted from the transmitter to the network for reception by a far-end receiver, and while the transmitter is turned off, no control signal is transmitted to the network from the transmitter to conserve power consumed by the transceiver, wherein the pattern is customized based on characteristics of the far-end receiver.

30. The transceiver of claim 29 wherein the pattern is customized based on a duration and a frequency that the far-end receiver requires for the transmitted control signal to be received by the receiver in order to maintain the receiver in a ready state, the maintaining the receiver in a ready state including updating at least one filter of the receiver and maintaining a timing lock of the receiver relative to the transmitter.

31. The transceiver of claim 29 wherein the turning off of the transmitter provides a quiet interval and the turning on of the transmitter provides a refresh interval, and wherein the pattern includes providing at least one quiet interval and a plurality of refresh intervals, at least two of the refresh intervals having different durations.

32. The transceiver of claim 29 wherein the pattern is customized based on a negotiation of parameters performed by the transmitter and the receiver before the low-power idle mode is entered.

* * * * *